Jan. 15, 1957   R. G. DAUDELIN   2,777,455
HIGH PRESSURE CONTROL VALVE
Filed July 31, 1951   2 Sheets-Sheet 1
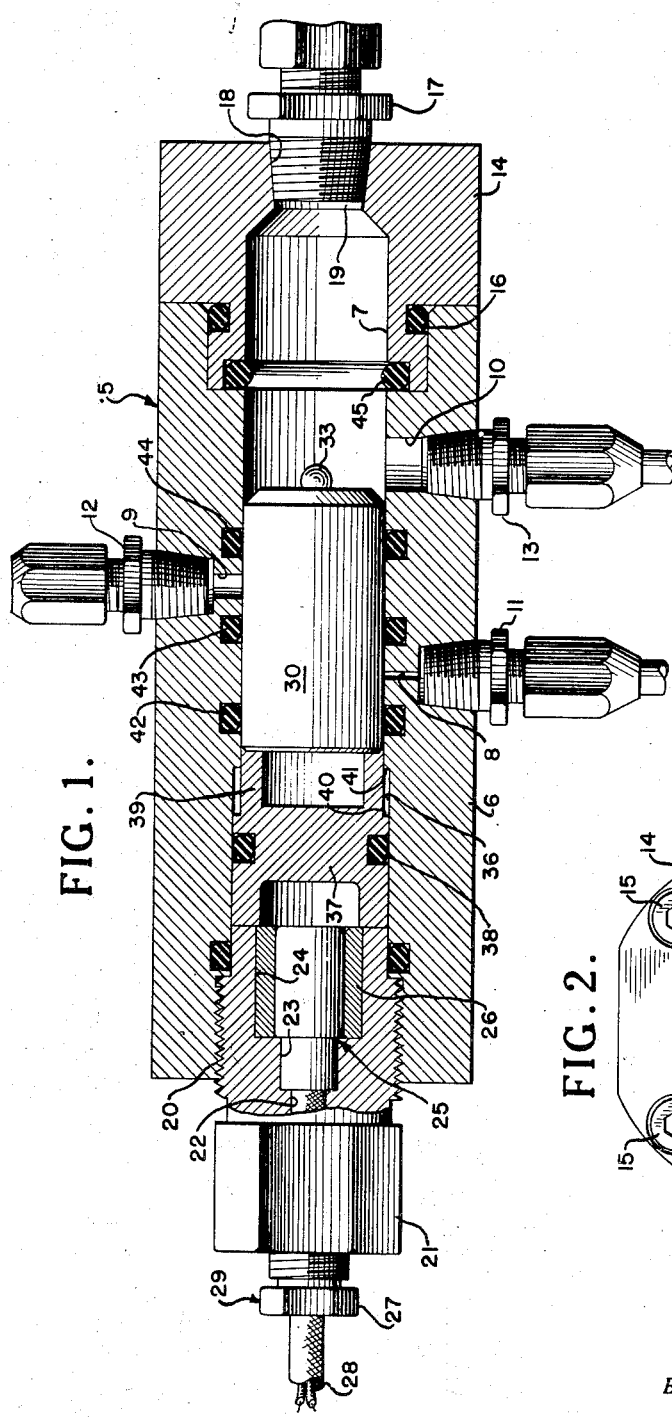
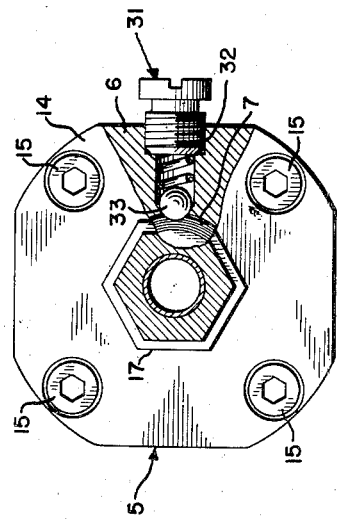
INVENTOR.
R. G. DAUDELIN
BY
ATTYS.

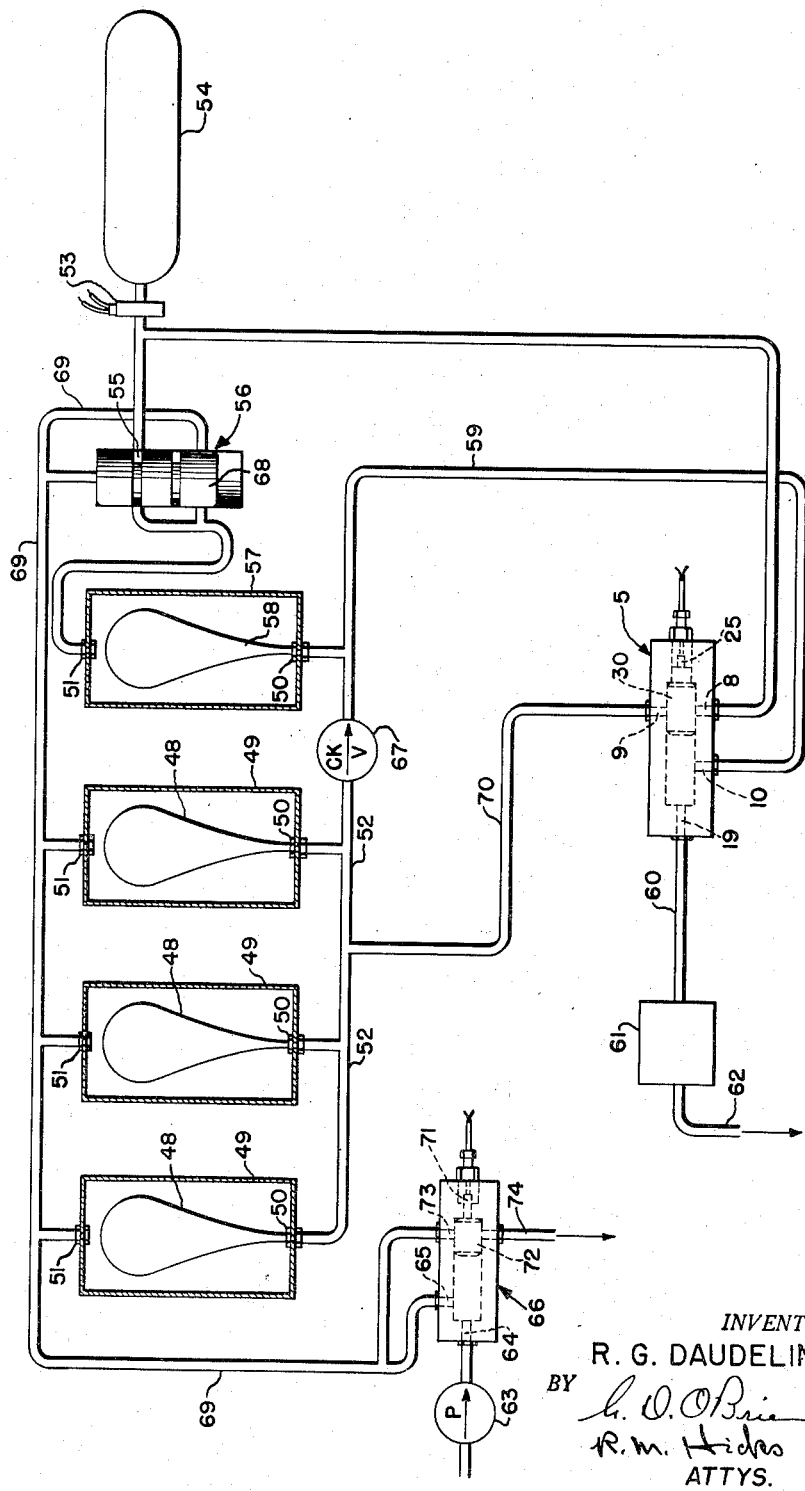

2,777,455

HIGH PRESSURE CONTROL VALVE

Roland G. Daudelin, Silver Spring, Md.

Application July 31, 1951, Serial No. 239,602

9 Claims. (Cl. 137—68)

(Granted under Title 35, U. S. Code (1952), sec. 266)

This invention relates generally to high pressure valves and more particularly to a valve arrangement of the type indicated suitable for use in a torpedo propelling system wherein hydrogen peroxide is employed as one of the propelling agents.

Prior to the acceptance of a torpedo for service use, numerous tests must be conducted thereupon including a number of service runs whereby the functional characteristics of the torpedo controls may be determined under actual service conditions. Such tests require that the torpedo be recovered upon the completion of each run whereby after a predetermined number of satisfactory tests the torpedo is considered acceptable for service use.

In order to facilitate the recovery of the torpedo upon the completion of each such test, a normally negatively buoyant torpedo is made buoyant by discharging from the fuel system of the torpedo a quantity of water taken on by the torpedo as the fuel therefor is consumed to cause, at the completion of the run, the torpedo to rise to the surface of the water. The accomplishment of the above operation is facilitated by the valve arrangement of the present invention which, at the completion of each test run, operates in a novel manner to introduce into the fuel system of the torpedo a quantity of high pressure air concurrently with establishing a fluid connection for discharging from the system the water taken on during the run whereby as the water is expelled by the air the torpedo is thusly made buoyant.

An object of the present invention is to provide a new and improved high pressure fluid valve wherein a flow controlling piston is pyrotechnically actuatable from an initial flow controlling position to a second flow controlling position.

A further object of this invention is to provide a fluid controlling valve wherein the flow of fluid through the valve is controlled by movement therein of a piston actuatable in response to force applied thereto from a pyrotechnic source.

A still further object is to provide a high pressure multiple outlet fluid valve wherein a plurality of sealing rings operate to respectively isolate the outlets of the valve responsive to movement therebetween of a pyrotechnically actuated piston.

A further object is to provide a fluid controlling valve wherein the force of the fluid controlled by the valve becomes effective to maintain the valve in an operated position.

Other objects and many of the attendant advantages of this invention will be readily appreciated as the same becomes better understood by reference to the following detailed description when considered in connection with the accompanying drawings wherein:

Fig. 1 is a side view partly in section and partly cut away of the multiple outlet valve of the present invention;

Fig. 2 is an end view of the valve partly cut away and showing the arrangement therein of the piston retaining ball detent in piston retaining position;

Fig. 3 is a schematic view in part of a hydrogen peroxide, sea water, and high pressure air system of a hydrogen peroxide fueled torpedo and showing the arrangement in the system of the valve of the present invention.

Referring now to the drawings and more particularly to Figs. 1 and 2 thereof, the valve of the present invention, and generally designated 5, is shown therein to include an elongated body member 6 wherein is provided a centrally arranged bore 7. Intersecting this bore are a plurality of ports 8, 9 and 10 wherein are respectively threaded coupling members 11, 12 and 13.

Arranged for closing one end of the bore 7 is a cap piece 14 through which a plurality of machine screws 15 extend for securing the cap to the end of the body member as illustrated to advantage in Fig. 2. By the arrangement of an O-ring gasket 16 within a groove provided therefor about the cap piece 14, a pressure seal is established therebetween and the body member 6 as the cap is drawn to the body by the tightening of the screws 15. A fluid coupling member 17, threaded as at 18 within a centrally disposed port 19 within the cap provides thereby means for discharging from the valve fluid admitted thereto, during the operation of the valve, by way of the port 10.

Threaded, as at 20, within the opposite end of the body member 6 from the cap piece 14 is a plug member 21 wherein is provided a centrally arranged bore 22. A pair of counter bores 23 and 24 concentrically disposed with respect to the bore 22 provides within the plug a receptacle wherein is received, preferably as by press fitting, an electroresponsive squib or detonator assembly generally designated 25 and including a cylindrical sleeve 26. There is provided as means for preventing moisture from entering the valve about a pair of detonator leads 28, a conventional gland nut assembly 29 including a gland nut 27 threaded in a conventional manner within the end of the plug and adapted when tightened to compress about the leads in pressure sealing relation a quantity of packing arranged, but not shown, beneath the nut.

Disposed for axial movement within the bore 7 is closely fitted piston member 30. By the arrangement of a spring actuated ball detent assembly, generally designated 31 and threaded as at 32 within the body member 6, Fig. 2, the piston is initially maintained by the ball 33 of the detent in the position illustrated in Fig. 1 until the ball is cammed from engagement with the piston as the latter is accelerated to a second position against the cap piece 14 following the ignition of the detonator 25. Movement of the piston in the above described manner causes an interruption of the fluid circuit between ports 10 and 19 as a second fluid circuit between ports 8 and 9 is thusly established.

Mounted for sliding movement within a counter bore 36 provided therefor in the bore 7 is a movable plunger 37 about which an O-ring gasket 38 maintains a high pressure seal therebetween and the valve body 6. By the provision on the plunger 37 of a flange section 39 a shoulder 40 is formed thereon suitable for intersecting a shoulder 41 formed by the counterbore 36 whereby as the plunger is accelerated against the piston, upon the firing of the detonator 25, sufficient impetus is applied by the plunger to the piston during the limited travel of the plunger as to direct the piston through the bore 7 and against the cap piece 14.

By the disposition of O-ring seals 42, 43 and 44 respectively arranged within the grooves provided therefor within the bore 7, the respective ports 8 and 9 are fluidly isolated during such time as the piston 30 is initially interposed therebetween prior to the operation of the valve. As the position of the piston 30 is shifted during the operation of the valve to come to rest against the cap piece 14, an O-ring seal 45, similarly arranged within the bore 7 to the ring 44 becomes effective with this ring to fluidly isolate the ports 10 and 19 whereby the fluid circuit initially open between ports 10 and 19 is closed. As the valve is operated by movement of the piston in the manner described, the plunger 37 provides a pressure sealing closure for the end of the bore 7 nearest the plug 21 whereby fluid within the valve is prevented, by reason of the gasket 38, from entering the vicinity of the detonator 25.

The position of the port 8, and through which high pressure is admitted to the valve during the interval of operation thereof, is such that as the piston is accelerated toward its second position by force applied thereto from the detonator 25 and thereby caused to move within the bore 7 beyond the intersection of the port 8, the pressure admitted to the bore 7 from this port and behind the piston serves to apply additional impetus to the piston during its travel toward the cap 14 and further to maintain the piston in its second or operated position against any lesser pressure directed against the forward end of the piston from the port 19.

A better understanding of the operation of the present valve may become more clearly apparent when discussed in connection with its use in a hydrogen peroxide fuel system, Fig. 3, of a torpedo wherein the valve arrangement of applicant has been found particularly suitable.

The fuel system, as illustrated, is comprised of a plurality of hydrogen peroxide filled collapsible bags 48 respectively arranged within suitably formed rigid tank members 49. A sealing connection is provided respectively between the tanks and mouths of the bags as at 50, whereby pressure when applied internally to the tanks, by way of the connections 51, has the effect of compressing the bags to cause the hydrogen peroxide therein to be forced through the mouth of the bags and into the header or fluid conduit 52.

As the torpedo is launched a suitable switching arrangement is provided for energizing a detonator responsive valve assembly 53 thereby to allow high pressure air from a receptacle 54 therefor to pass, by way of an open fluid circuit 55 in a control valve 56, to a starting tank 57 similar in construction to the tanks 49 and wherein is arranged in a similar manner a hydrogen peroxide filled bag 58.

As air pressure is thusly applied internally to the tank 57 and accordingly to the outer surface of the bag 58 the fluid within this bag is forced, by way of the connection 59, to the valve assembly 5 of the present invention to be admitted thereto by way of the port 10 and thence discharged from the valve by way of the port 19. A fluid conduit 60 connecting the valve port 19 with a catalyst chamber 61 passes thereto the hydrogen peroxide wherein responsive to a catalytic action the hydrogen peroxide is decomposed into oxygen and steam. This mixture, when passed to the engine of the torpedo by way of the connection 62, provides a necessary portion of the fuel required to drive the torpedo through the water.

As the engine of the torpedo is thusly put in operation, a positive displacement pump 63, driven by the engine, is likewise activated to draw water from the surrounding medium and drive it under pressure into the tanks 49 by way of the initially connected ports 64 and 65 of a flushing valve assembly 66. As water pressure is in this manner applied to the outer surface of the bags 48 the hydrogen peroxide therein is caused to be driven from the bags by way of a check valve 67 to the valve 5 and thence to the engine in the manner previously described. Fluid pressure from the pump 63, in addition to forcing the hydrogen peroxide from the bags 48, further provides for shifting the position of a piston 68 of the control valve 56 to interrupt the supply of air from the receptacle 54 concurrently with connecting with the tank 57 the water pressure supply line 69 from the pump 63 whereby in this manner the remaining hydrogen peroxide is forced from the starting bag 58 by water pressure in a similar manner to the discharging of the hydrogen peroxide from the bags 48.

At the completion of the torpedo run, and which is determined by the exhausting of the fuel from the system and consequently the stopping of the torpedo engine, the pump 63 thereby ceases to operate whereupon the torpedo now negatively buoyant starts descending toward the bed of the body of water.

As the torpedo settles within the water a hydrostatic switch or other such similar apparatus, not shown, operates to effect the energization of the detonator 25 of valve 5 to drive the piston 30 thereof from its initial position to its second position against the cap piece 14 thereof for closing the fluid circuit to the catalyst chamber 61 concurrently with connecting in fluid circuit the ports 8 and 9.

Upon movement of the piston 30 of the valve 5 in the manner described, high pressure air admitted to the valve by way of port 8 and initially controlled by the piston 30 is discharged from the valve by way of the port 9 into the hydrogen peroxide system including the connection 70 to pass by way of the connection 52 into the bags 48 and 58 thusly to expand the bags outwardly against the water within the respective tanks 49 and 57.

Upon energization of a detonator 71 of the flushing valve 66 the position of a piston 72 therein is shifted for connecting a port 73 of the valve to a discharge line 74 whereupon the air pressure now being applied internally to the bags 48 and 58 may force the water from the tanks and into the surrounding water. As the water is thusly forced from the system the torpedo is made buoyant to rise to the surface of the water from whence it may be recovered by the test crew.

For further details of the construction and operation of the flushing valve assembly 66, reference may be had to my copending application for High Pressure Control Valve, Serial No. 239,603, filed July 31, 1951.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. A high pressure valve of the character disclosed including, in combination, a body member, means forming a first fluid circuit through said body member, means forming a second fluid circuit through said body member, a piston movably disposed in said body member and initially positioned for closing the first fluid circuit through said body member, means for energy transfer actuation of said piston, an electroresponsive detonator disposed in said body member and fireable responsive to an electric signal to effect drive of said energy transfer means for movement of said piston from said initial position to a second position for closing said second fluid circuit, and means forming a part of said body member for communicating pressure from said first fluid circuit to said piston for maintaining said piston in said second position against a lesser pressure in said second fluid circuit.

2. A high pressure valve of the character disclosed comprising, in combination, an elongated casing having therein an elongated bore, means forming a pair of ports intersecting said bore to provide a first fluid circuit through said valve, means forming a second pair of ports intersecting said bore to provide a second fluid circuit through said valve, a piston disposed for close fitting sliding movement within said bore and initially disposed in flow interrupting position in said first fluid circuit and movable to a flow interrupting position in said second circuit, driving means for providing movement of said piston, and an electroresponsive detonator disposed in one end of said bore and fireable responsive to an electric signal to effect movement of said driving means to move the piston from its initial position to a second position to open said first fluid circuit as the second fluid circuit is closed by movement therein of said piston.

3. A high pressure valve of the character disclosed comprising, in combination, an elongated body member having therein an axially arranged bore extending through said body member, a cap piece closing one end of said bore and having therein a centrally disposed port concentrically arranged with respect to said bore and in fluid circuit therewith, means forming a second port within said body member and intersecting said bore in close spaced adjacency with said first port whereby fluid is communicated between said ports by way of said bore, a threaded plug member closing the other end of said bore and having therein a centrally disposed recess, an electroresponsive detonator arranged in said recess and including a pair of electrical leads extending outwardly from said plug whereby an electrical signal may be communicated to said detonator for firing the detonator, a piston arranged for close fitting sliding movement within said bore, a driving means for said piston disposed in adjacency thereto for limited travel therewith and having an initial position therein in adjacency to said detonator and responsive to the firing thereof for acceleration of said piston through said bore in the direction toward said cap piece, and means including a pair of ports in said body member forming a second fluid circuit through said valve and initially closed by said piston and opened thereby upon movement of the piston from said initial position to a second position against said cap piece and between the first and said second ports to thereby close said first fluid circuit.

4. A high pressure valve as set forth in claim 3 further characterized by the provision of yieldable means including a ball detent for retaining said piston in said initial position prior to the firing of said detonator.

5. A high pressure water filling and flushing valve of the character disclosed for use in a hydrogen peroxide fuel system for an underwater torpedo comprising, in combination, a valve body having therein an elongated bore, means for completing a water filling circuit through said body and including a section of said bore, means for completing a water flushing circuit through said body and including a section of said bore, a piston arranged for close fitting sliding movement within said bore and having an initial position therein for interrupting fluid flow through said flushing circuit, a slideable driving member for imparting movement to said piston, means for limiting travel of said driving member to a lesser travel than said piston, an electroresponsive detonator disposed in one end of said body and fireable responsive to an electric signal to accelerate said driving member to move said piston from said initial position to a second position for interrupting said filling circuit, and means cooperative with said piston to form a high pressure seal within said filling circuit as said piston moves to said second position.

6. A high pressure valve of the character disclosed adapted for controlling fluid flow in a hydrogen peroxide fueling system and comprising, in combination, an elongated valve housing having an axially arranged bore extending therethrough, a cap piece secured to said housing at one end of said bore and including therein a port concentrically aligned with said bore, a plug threaded into the other end of said bore and having formed therein a recess, an electroresponsive detonator fireable responsive to an electrical signal and arranged in said recess, a piston closely fitted for sliding movement in said bore, a piston actuating member disposed between said piston and said detonator with an initial position in adjacency to said plug means providing a stop for said actuating member in the path of travel thereof whereby to provide for less travel of said member than that provided for said piston said actuating member being responsive to the firing of said detonator to cause the piston to be actuated thereby through said bore to a second position against said cap piece and across said port, means forming a second port in said body member initially in fluid circuit with said first port and arranged to be fluidly isolated therefrom by movement of said piston against said cap, and means forming a second fluid circuit through said valve initially closed by said piston when in said initial position and arranged to be opened by movement of said piston to said second position against said cap.

7. A high pressure valve of the character disclosed comprising, in combination, an elongated body section having a centrally arranged bore extending therethrough, means forming a counterbore in one end of said bore thereby to provide a shoulder at the intersection of said bores, a cap piece closing said bore and including a second bore constructed and arranged to form a continuation of the first said bore, means forming in said cap a port in fluid circuit with said second bore and concentrically aligned therewith, means forming in said body a second port intersecting said bore and in fluid circuit with the first said port to provide by way of said bore a low pressure fluid circuit through said valve, a plug piece threaded into said body member for closing one end of said counterbore, a plunger disposed for movement within said counterbore and initially positioned in abutting adjacency to said plug piece, an electroresponsive detonator arranged in said plug piece and fireable responsive to an electric signal to move said plunger from said initial position to a second position against said shoulder, port means forming a high pressure fluid circuit through said body member and intersecting the first bore, a piston disposed for sliding movement within the first bore and having an initial position for interrupting fluid flow through said high pressure fluid circuit and driveable by said plunger from said initial position to a second position against said cap piece to close said low pressure fluid circuit while alternatively opening said high pressure fluid circuit to permit fluid pressure from said high pressure fluid circuit to be communicated by way of said bore to said piston to maintain said piston in said second position thereof against said cap piece, and means including a plurality of resilient O-rings arranged in said bore and cooperative with said piston to maintain a high pressure seal between said port and port means during such time as the piston is interposed therebetween selectively.

8. A high pressure valve as set forth in claim 7 but further characterized by the provision of yieldable means for maintaining said piston and plunger as initially positioned within said bore and counterbore respectively prior to the firing of said detonator.

9. A high pressure valve of the character disclosed including, in combination, an elongated body member having a first centrally disposed bore in one end thereof, a cap piece closing one end of said first bore, said body member including a first port in fluid communication with said first bore, means forming a second port in closely spaced adjacency to said cap and initially in fluid communication with said first port by way of said first bore, means forming in said body member a second bore which is an enlarged continuation of said first bore, a piston disposed for sliding movement within said first bore, piston driving means slideably disposed in said second enlarged bore, said driving means including an extension closely fitted within said first bore, a plug member threadedly mounted in said body and disposed to close said second enlarged bore, an electroresponsive detonator disposed in said plug member and fireable in response to an electrical signal for directing a driving force against said piston driving means to accelerate said piston from an initial position in adjacency thereto in said first bore to an operated position spaced therefrom and against said cap piece for interrupting fluid flow between said first and second ports, means forming a second fluid circuit through said body member and initially closed by said piston and opened by movement of said piston to said operative position to connect in fluid circuit with the end of said piston fluid pressure from said second circuit whereby said piston is maintained by said last named fluid pressure against said cap piece, and means including a resilient O-ring interposed in said first bore between said first and second ports for maintaining a high pressure seal therebetween when the piston is in said operated position.

References Cited in the file of this patent

UNITED STATES PATENTS

| | | |
|---|---|---|
| 2,148,410 | Wait | Feb. 21, 1939 |
| 2,441,894 | Mennecier | May 18, 1948 |
| 2,447,651 | Jennings et al. | Aug. 24, 1948 |
| 2,485,504 | Morgan | Oct. 18, 1949 |
| 2,698,730 | Ensminger | Jan. 4, 1955 |

FOREIGN PATENTS

| | | |
|---|---|---|
| 724,496 | France | Jan. 29, 1932 |